United States Patent [19]

Rohs

[11] 3,727,494

[45] Apr. 17, 1973

[54] INSTALLATION FOR MACHINING CRANKSHAFTS, CAMSHAFTS OR LIKE WORKPIECES

[76] Inventor: Hans Günther Rohs, 9 Richard-Wagner-Strasse, Rechberghausen, Germany

[22] Filed: Jan. 10, 1972

[21] Appl. No.: 216,380

Related U.S. Application Data

[63] Continuation-in-part of Ser. No. 14,485, Feb. 26, 1970, abandoned.

[52] U.S. Cl. ................................82/2.5, 82/3, 82/9, 82/20

[51] Int. Cl. ..............................................B23b 15/00

[58] Field of Search......................... 82/2.5, 3, 8, 9, 20

[56] References Cited

UNITED STATES PATENTS

| | | | |
|---|---|---|---|
| 2,807,974 | 10/1957 | Meyer et al. | 82/9 |
| 2,371,906 | 3/1945 | Millholland | 82/2.5 X |

FOREIGN PATENTS OR APPLICATIONS

| | | | |
|---|---|---|---|
| 1,202,619 | 10/1965 | Germany | 82/3 |

*Primary Examiner*—Leonidas Vlachos
*Attorney*—B. Edward Shlesinger et al.

[57] ABSTRACT

The subject matter of the present invention is an installation for machining crankshafts, camshafts or like workpieces. Each of the workpiece is mounted in non-rotary condition in a workpiece holder. A plurality of such workpiece holders is guided on a straight path with their workpieces in co-axial relationship to each other and to said path. A plurality of tool units is distributed in spaced relationship along the path. Each unit includes an annular rotary tool having internal cutting edges. This tool surrounds an internal clearance space which is larger than the cross-section of the workpiece holders. Therefore, each tool affords passage of said workpiece holders through the clearance space. Each of the tool units further comprises means for moving the annular rotary tool into a position in which its internal clearance space is in registry with the path of the workholders. Conveyor means are provided for intermittently transporting said workpiece holders with the workpieces on a guideway along the path through the clearance spaces of the tool units and for temporarily stopping each workpiece holder in a position in which its workpiece is surrounded by said annular rotary tool and in a position to be machined by the cutting edges thereof. The conveyor means may comprise drag members which are distributed along the path and are adapted to engage the workpiece holders. These drag members are reciprocated parallel to said path in synchronism with each other and thereby feed each of the workpiece holders step by step along the path consecutively through the annular rotary tools.

5 Claims, 9 Drawing Figures

INVENTOR

Hans Günther Rohs

BY Shlesinger, Fitzsimmons & Shlesinger

ATTORNEYS 64
62
18
56
54
19
18'
27
W'
60
58
50
13
52
66
68
80
76
94
88
82
72
78
70
21
86
74
84
98
20
44
34
48
40
32
10

21

W'
96;50
94
90
13
92

66
64
62
56
18
54
21
19
27
21
94
W'
50
80
68
72
76
82
78
74
18'
20
34
44
48
40
32
10

21
94
50
92
99
W'

Fig. 8
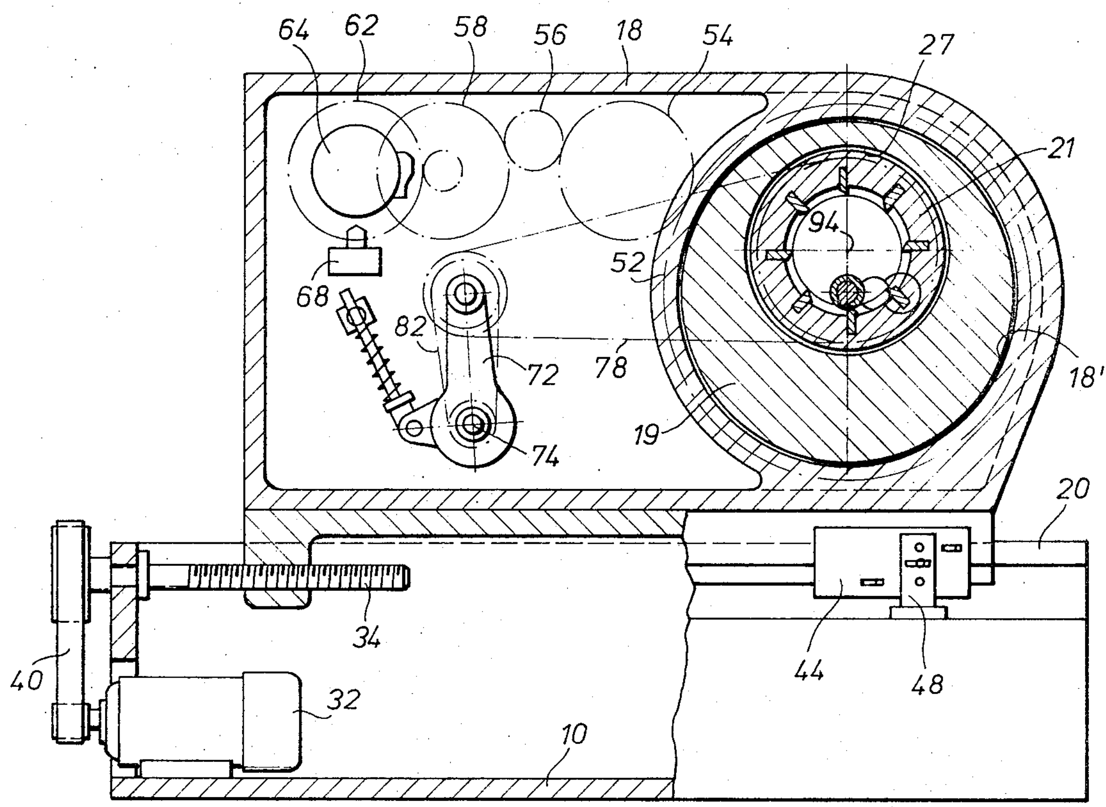
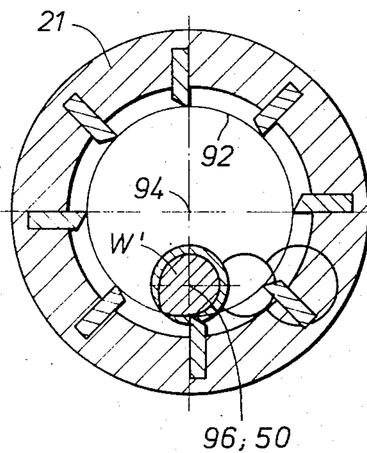
Fig. 9

INSTALLATION FOR MACHINING CRANKSHAFTS, CAMSHAFTS OR LIKE WORKPIECES

My invention relates to an installation for machining elongate workpieces such as crankshafts, camshafts or the like.

This patent application is a continuation-in-part of my Pat. application Ser. No. 14,485 filed on Feb. 16, 1970 and now abandoned claiming a convention priority of a German patent application filed Feb. 28, 1969.

BACKGROUND AND OBJECTS

It has been customary heretofore to use lathes or similar machine tools for machining crankshafts such machine tools being equipped with rotary workpiece holders for imparting rotation to the workpiece about the axis of the line bearings or about the axis of the crank bearings of the crankshaft and with substantially stationary tool supports supporting the tools for the feeding motion thereof.

It is desirable for the efficient mass production of machine parts to use an installation which comprises a plurality of work holders guided along a path each having means for holding a workpiece, a plurality of tool units distributed along the path in spaced relationship, and conveyor means for intermittently transporting said workpiece holder along said path and for temporarily stopping each workpiece holder in a position in which its workpiece is machined by the rotary tool. Such an installation, however, does not lend itself easily to the equipment with lathes or similar machine tools because of the difficulties involved in the intermittent transportation of the workpieces requiring that these workpieces be properly mounted on the rotary work holders of the lathes prior to the machining operation and subsequently be properly discharged from the work holders for transportation to the next lathe.

Therefore, it is an object of the present invention to provide an installation for machining elongate workpieces such as crankshafts, camshafts or the like in which the tool units are of a type machining the workpieces while the same are held stationary. Tool units of this type are old in the art. Such a tool unit includes an annular rotary whirling tool having internal cutting edges and an internal clearance space. The workpiece is in stationary condition while being surrounded by the rotary tool and being machined by the cutting edges thereof.

Therefore, it is a more specific object of the invention to provide an installation for machining crankshafts, camshafts or the like in which workpiece holders each having means for holding a workpiece fixed against rotation are intermittently fed along a straight path presenting the workpieces consecutively to tool units distributed along the path.

It is another object of the present invention to provide an installation of the kind described in which the workpieces are automatically transported from one working station to the next, which is of simple design and which requires a minimum of space.

Further objects of the invention and the advance in the art attained thereby will appear from the description of a preferred embodiment of the invention illustrated in the accompanying drawings. It is to be understood, however, that such description serves the purpose only of illustrating rather than that of limiting or restricting the invention. Therefore, the invention is in no way limited to the details of such embodiment but is capable of numerous modifications within the scope of the appended claims.

DETAILED DESCRIPTION

In the drawings

Figure 1:
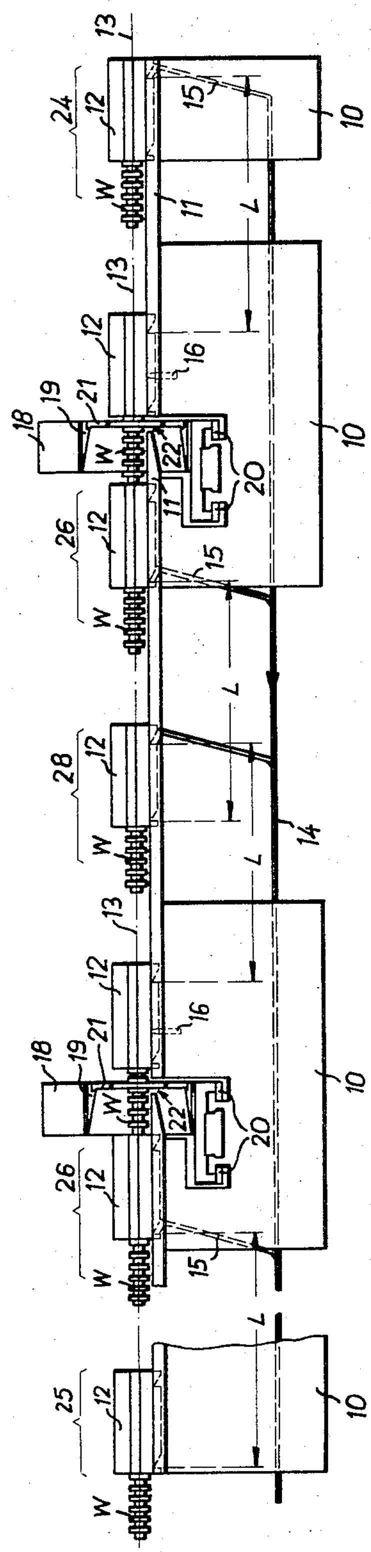
Figure 2:
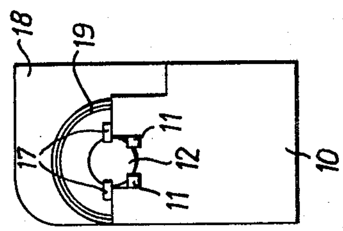
Figure 3:
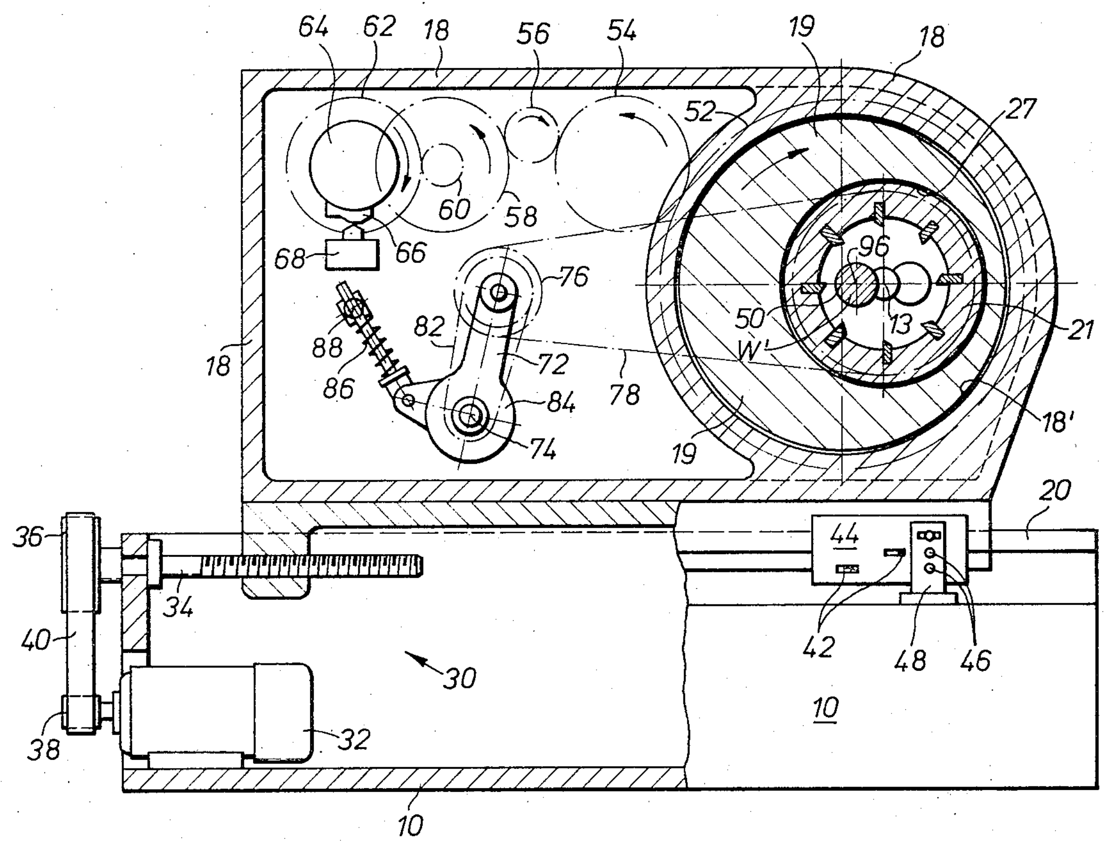
Figure 4:
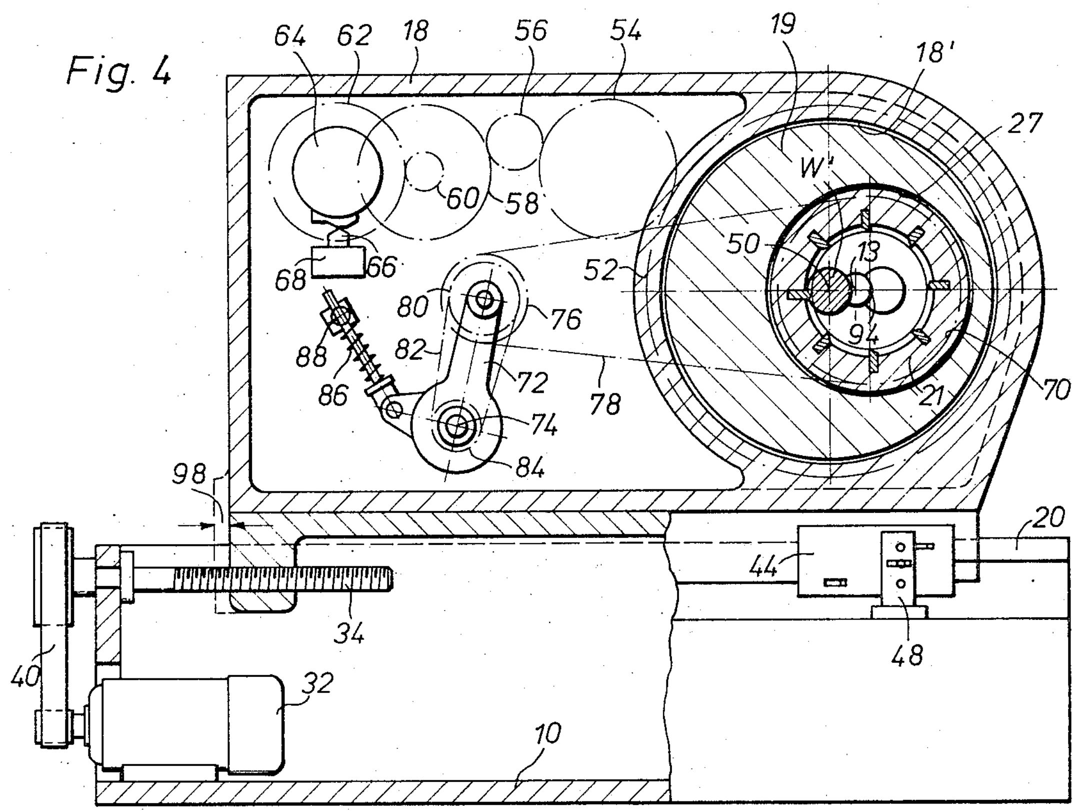
Figure 5:
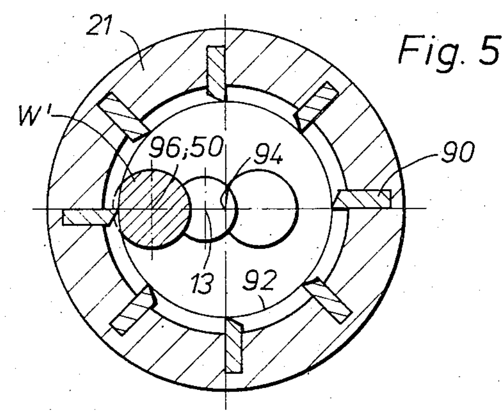
Figure 6:
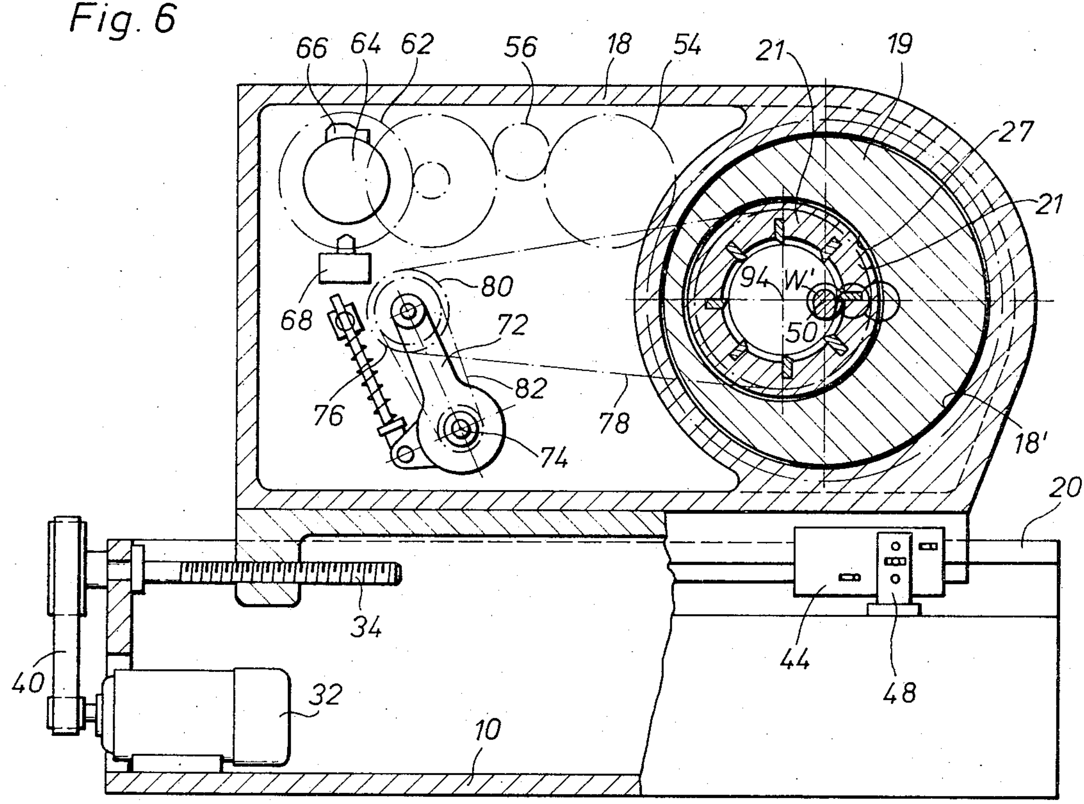
Figure 7:
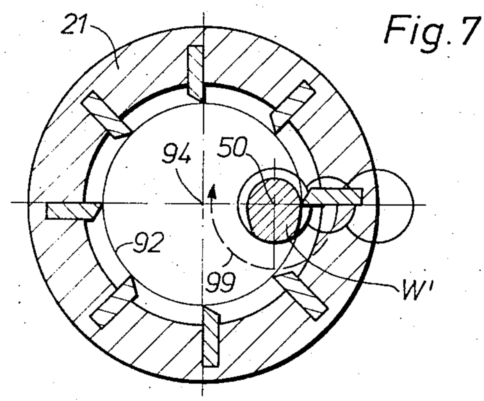

FIG. 1 is an elevation of an installation for machining crankshafts, such installation comprising a plurality of workpiece holders and a plurality of tool units, some of the workpiece holders and of the tool units being omitted in order to simplify the illustration, FIG. 2 is an end view of the installation viewed from the right with regard to FIG. 1, FIG. 3 illustrates a slightly modified embodiment showing an end view of one of the beds similar to FIG. 2 on an enlarged scale, partly in section along a vertical transverse plane extending through the tool holder, the rails guiding the workpiece holders being omitted for sake of clarity, the annular rotary tool being positioned in registry with the path on which the workpiece holders are conveyed, FIG. 4 is a view similar to FIG. 3 differing therefrom by an infeed displacement of the tool holder, FIG. 5 is a cross-section of the rotary annular tool in the position shown in FIG. 4 and of the workpiece, FIG. 6 is a view similar to FIG. 4 differing therefrom by angular displacement through about 180° of the rotor supporting the annular rotary tool, FIG. 7 is a sectional view of the tool and of the workpiece in the position illustrated in FIG. 6, FIG. 8 differs from FIG. 6 by angular displacement of the rotor by another angle of 90°, and FIG. 9 is a sectional view of the annular rotary tool and of the workpiece in the position shown in FIG. 8 on an enlarged scale.

The installation shown in the drawings comprises a series of beds 10 carrying at the same level horizontal and parallel rails 11 which form a track for workpiece holders 12. Each of these holders supports a workpiece W, for instance a crankshaft. The workpieces are secured to their respective holders 12 in a non-rotary condition in such positions that they are aligned with each other in the direction of their common axis 13.

The beds 10 are provided with a conveyor which is movable step-by-step and which advances the workpiece holders 12 simultaneously in the direction of axis 13. In the case of the embodiment shown, the conveyor consists of a movable bar 14, extending through the beds in the longitudinal direction, the bar having drag members, such as rods 15 which are each adapted to engage one of the workpiece holders 12. The bar 14 can be reciprocated in its longitudinal direction by a predetermined amount L, representing a forward or backward step. If the bar 14 is moved towards the left in FIG. 1, the drag rods 15 engage the workpiece holders 12 and move the latter toward the left by the length L. When the bar 14 makes its return movement (to the right in FIG. 1), the drag rods 15 move aside, clearing the path for the workpiece holders 12. During the return of the bar 14 the workpiece holders 12 are each retained in position on the rails 11 by means of bolts 16 which can be retracted into the beds 10 and which when raised, arrest the workpiece holders exactly in their desired positions. Horizontal clamping rails 17 are arranged above the rails 11 and adapted to be lifted and lowered in the beds 10 by suitable means mounted on the beds 10. The rails 17 serve the purpose of clamping each workpiece holder 12, when arrested to the beds 10. Each workpiece holder 12 has furthermore, lower guide surfaces sliding on the rails 11, and upper surfaces engageable by the clamping rails 17.

The installation is further provided with a plurality of tool units distributed along the track in spaced relationship, each of said units including a tool holder 18 which is formed with an internal cylindrical bearing face 18' on which a rotor 19 is journaled, so that its axis of rotation is parallel to the axis 13, the tool holder being displaceable along a guideway 20 which extends in the bed 10 across the axis 13 so that the tool holders can be moved into a position in which the axis of rotation of their rotors 19 coincides with the common axis 13 of the workpieces W. Each rotor 19 is provided with an internal cylindrical bearing face 27 eccentrically disposed with respect to the bearing face 18'. An annular whirling tool 21 is surrounded by and journaled on the bearing face 27, the cutting edges of the tools 21 being directed inwardly. The dimensions in the transverse direction of each workpiece holder 12 are smaller than the internal clearance space of the annular tools 21.

The track formed by the rails 11 has gaps 22 next to the tool holders 18, in which gaps the tools 21 are arranged. The length of these gaps is less than the length of the workpiece holders 12 to that the latter can slide over the gaps without losing their support on the track.

Holding or waiting stations 26, 28 for the workpiece holders 12 are arranged between respective tool holders 18. The bottom of each workpiece holder 12 is provided with a first recess near its front end and with a second recess near its tailing end. As shown in FIG. 1, a drag rod 15 which is in its right-hand starting position and engages the second recess of the holder 12 at station 24 when moved by the bar 14 towards the left through the distance L will move the holder 12 towards the next tool unit introducing the workpiece W projecting forwardly from the holder 12 into the annular tool 21. During the period of the feed motion of bar 14 towards the left with reference to FIG. 1 each tool holder 18 is held on guideway 20 in such position and the rotor 19 therein is simultaneously held in such an angular position on the bearing face 18' that the center of bearing face 27 coincides with the axis 13. This will be explained in detail with reference to a slightly modified embodiment illustrated in FIGS. 3 – 9. The workpiece before reaching the cutting position will engage the preceding work holder 12 whose workpiece has just been machined and will push this preceding work holder forwardly out of the tool unit into the position shown at 26. In this position the preceding work holder presents its first bottom recess to another drag rod 15 for engagement thereby and for forward transportation during the next forward movement of bar 14. This will bring the workpiece holder 12 to the waiting position 28. During the next forward movement of rod 14 another drag arm 15 will engage the second bottom recess of the holder 12 resting at station 28 and during the subsequent forward motion of bar 14 will feed the holder into the second tool unit and in so doing will push a workpiece holder 12 out of the second tool unit as described hereinabove. Thus, whilst a workpiece holder 12 is moved after machining of a workpiece W at one of its surface spots to the waiting station 28, the workpiece holder 12 which has been positioned on that station, is advanced at the same time to the next tool holder 18 which subsequently machines another spot of the same workpiece W (which in the embodiment described here is a crankshaft).

Arranged at the right-hand end of the track is the charging station 24 for workpiece holders 12 to which subsequently the workpiece W is clamped. During the next step forward of the conveyor, the workpiece W is moved to the tool holder 18 at the first machining station. During this movement, as stated hereinabove, the rotor 19 of the tool in that holder is turned into such an angular position, and the tool holder 18 is moved on its sliding track 20 into such a position, that the center of the annular whirling tool 21 coincides with the axis 13 and that the workpiece W can move through that tool far enough for the surface spot to be machined on that workpiece to be presented to that tool. As soon as the workpiece holder 12 has arrived in that position, it is arrested by a bolt 16 and clamped to the rails 17. Thereafter the conveyor is moved a step back whilst the tool holder 18 travels along the sliding track 20 into its operative position, whereupon the tool 21 and the rotor 19 begin to rotate through one or two revolutions causing the rapidly rotating annular tool 21 to orbit about the axis of the workpiece, the paths described by the cutting edges enveloping tangentially the cylindrical workpiece section to be machined, each cutting edge cutting a short chip therefrom. This will be explained in detail with reference to a slightly modified embodiment illustrated in FIGS. 3 – 9.

After machining has been terminated, the rotor 19 is moved into such an angular position and the tool holder 18 is moved so far along the sliding track 20, that the tool 21 is co-axial again with the axis 13. The rails 17 are then released and the bolt 16 retracted whereupon the conveyor moves forward another step. This movement takes another workpiece into each tool holder 18 and takes the workpiece which has just been machined to the station 26. At the same time the workpiece which had been resting at 26 is moved to the waiting station 28.

Arranged at the end of the track formed by the rails 11 is a station 25 at which a finished workpiece is unclamped from its holder 12, taken out of it and transported to the next station in the production flow-line.

The number of tool holders 18 provided in the installation corresponds to the number of surface spots or zones which have to be machined on a workpiece. When the number of workpieces fed into the installation is equal to that of tool holders and waiting stations, the tools in all tool holders are engaged in the simultaneous machining of workpieces in the respective holders, and each step of the conveyor results in that a finished workpiece is ready for unclamping at station 25 and at the same time station 24 is ready for clamping a fresh workpiece. The workpiece holders are returned from station 25 to station 24 by auxiliary conveyors not shown.

The embodiment of the invention shown in the FIGS. 1 and 2 may be modified in various respects. It is for instance possible to use an endless conveyor and also to dispense with the waiting stations 28.

In FIGS. 3 – 9 another embodiment of the invention is illustrated differing from that shown in FIGS. 1 and 2 by the shape of the beds 10 and of the tool holders 18.

As stated hereinabove, each tool holder 18 is displaceable along a guideway 20 which extends on the bed 10 transversely to the axis 13. This displacement is effected by a feed mechanism 30 which is mounted on the bed 10 and comprises an electric feed motor 32, a feed spindle 34, sheaves 36 and 38 mounted on the spindle 34 and on the shaft of motor 32 respectively and an endless belt 40. The feed spindle 34 extends parallel to the guideway 20 and is journaled in the bed 10 for rotation and held against axial displacement. It engages internal threads of a horizontal bore provided in a downward projection of the tool holder 18. Abutments 42 adjustably mounted on a plate 44 fixed to the tool holder 18 cooperate with limit switches 46 mounted on a supporting member 48 fixed to the bed 10. Suitable electrical control means are connected with the end switches 46 for so controlling the feed motor 32 as to move the tool holder 18 between an inactive position illustrated in FIG. 3 and an active position illustrated in FIGS. 4, 6 and 8. As such electrically control means are well known in the art, an illustration and a description thereof is deemed disposable herewith.

As described hereinabove, the tool holder 18 is formed with an internal cylindrical bearing face 18' having an axis 50 extending parallel to the axis 13, FIG. 1, in a common horizontal plane therewith. A rotor 19 is journaled within the tool holder 18 on the bearing face 18' and is provided with an annular set of gear teeth. While this set is not visible in FIGS. 3, 4, 6 and 8, it is diagrammatically indicated by its pitch circle 52. A set of meshing gears diagrammatically indicated by their dash-dotted pitch circles 54, 56, 58, 60, 62 establishes a driving connection between a feed motor (not shown) drivingly connected with the gear 56 and a control cam 64 rigidly connected with gear 62. The ratio of transmission of the gearing 52 — 62 is such that the cam rotates in synchronism with roller 19. A rise 66 of this cam cooperates with a limit switch 68 mounted on the tool carrier 18 for controlling the feed motor and is operative to stop the feed motor in the position in which the rotor 19 assumes the angular position shown in FIGS. 3 and 4. A starting switch, not shown, cooperates with the limit switch 68 and is operative, when actuated, to start the feed motor driving gear 56, rotor 19 and cam 64. The rotor 19 and the cam 64 will then revolve through one complete revolution whereupon the cam 66 returns to the position shown in FIGS. 3 and 4 depressing the limit switch 68 thereby stopping the feed motor, the rotor 19 and the cam 64.

As stated hereinabove, rotor 19 is provided with an internal cylindrical bearing face 27 eccentrically disposed with respect to the bearing face 18'. An annular whirling tool 21 is surrounded by and journaled on the bearing face 27. This annular whirling tool is provided with an annular set of sprocket teeth which while not shown in the drawings are diagrammatically indicated by their pitch circle 70, FIG. 4. An arm 72 is freely pivotally mounted on a horizontal shaft 74 extending parallel to the axis 50 and journaled in the tool holder 18. A sprocket 76 diagrammatically indicated by its pitch circle is connected with the set of sprocket teeth 70 by an endless chain 78 and is fixed to a coaxial sprocket 80 connected by an endless chain 82 with a sprocket 84 fixed to shaft 74. This shaft is drivingly connected with an electric tool motor, not shown. The arm 72 is urged in anti-clockwise direction by a spring 86 braced against a bolt 88 fixed to the tool holder 18 and acts on a projection of the hub of arm 72 thereby keeping the chain 78 taut.

The annular whirling tool 21 is provided with a set of internally projecting cutting blades 90, FIG. 5. The cutting edges of these blades describe a circle 92 which is concentric with the bearing face 27 of rotor 19 and has a diameter slightly larger than the largest transverse dimension of the workpiece holder 12 and of the workpiece W chucked on this workpiece holder in fixed position.

When the cam 66 assumes the angular position shown in FIGS. 3 and 4 the rotor 19 assumes an angular position in which the axis 94 of its internal bearing face and of the annular tool holder 21 is located in the same horizontal plane as are the axes 13 and 50.

When the tool holder 19 is in its inactive position illustrated in FIG. 3, the axis 13 coincides with the axis 94 of the internal bearing face 27 of the rotor 19. As a result, the workpiece supports 12 illustrated in FIGS. 1 and 2 are located concentrically to and surrounded by the circle 92. Moreover, the axis 50 of the internal bearing face 18' of the tool support 18 is spaced from the axis 96 of the crank shaft pin W' of the workpiece which is to be machined. In the embodiment shown, the axes 96 and 13 are located in the same horizontal plane although this is not a condition for proper operation. It is necessary, however, that the axes 50 and 96 are within the same horizontal plane.

The machine is equipped with a suitable control unit, such as a motor-driven set of cams cooperating with electrical switches which, in their turn, operate electric motors, magnetic valves, etc., for the performance of a sequence of operations which will now be described.

When the tool holder 18 is in its inactive position illustrated in FIG. 3, the bar 14 is moved back and forth through the distance L by suitable actuating means, as described hereinabove. This will load each tool holder 18 with a coordinated pin W' of the workpiece W, this workpiece assuming the position illustrated in FIG. 3.

In the next operation the tool motor driving shaft 74 will be started and will rotate the annular tool 21 with a velocity resulting in the proper cutting speed of blades 90 cutting along circle 92 in FIG. 5. Moreover, motor 32 will move tool holder 18 from its inactive position shown in FIG. 3 through a distance 98 shown in FIG. 4 to the active position illustrated in FIGS. 4 – 9. As a result, the axis 50 of rotor 19 will move from the position shown in FIG. 3 to a position coaxial with the axis 96 of the pin W' as shown in FIGS. 4 and 5. As a result, the blades 90 are fed into the pin W' of the workpiece cutting successive chips from the left side of pin W' with reference to FIGS. 4 and 5 until the cross-section of the pin will have the unsymmetrical shape illustrated in FIG. 5.

In the next operation the switch cooperating with limit switch 68 will be actuated thus initiating one complete revolution of cam 64 and of rotor 19 in clockwise direction moving the axis 94 of the whirling tool on a circular path concentric to the coinciding axes 96 and 50, first downwardly and to the left from the FIG. 4 position to a location below axis 50 then to the left and upwardly through the position shown in FIGS. 6 and 7 in which the axis 94 is at the left of axis 50. This path is indicated by a dotted line 99 in FIG. 7. The axis 94 will continue on this circular path through the position illustrated in FIGS. 8 and 9 until it will arrive in its starting position shown in FIGS. 4 and 5, when cam 64 will actuate limit switch 68 to thereby discontinue the revolution of rotor 19.

In the next operation motor 32 is started in reverse to thereby return the tool holder 18 from the actuated position shown in FIGS. 4 – 9 to its inactive position shown in FIG. 3.

The reduction in diameter of the workpiece pin W' depends on the diameter of circle 92 and, therefore, may be changed by a suitable readjustment of the blades 90 in the body of the annular tool 21.

The operator when setting up the machine must adjust support 48 on bed 10 in dependence on the length of the crank pin arms or, in other words, in dependence on the distance of the crank pin axis 96 from the line bearing axis 13, since the axes 96 and 50 must coincide in the active position of the tool holder 18.

While some of the units are set up to machine the crank pins of the workpiece, other units may be so set up as to machine the line bearing pins. In the latter case the distance 98 through which the tool holder 18 must be fed from its inactive position to its active position must be large enough to place axis 50 of rotor 19 coincidental with axis 13 upon displacement of tool holder 18 to its active position.

The embodiment of my invention described hereinabove is capable of numerous modifications within the scope of the appended claims.

What I claim is:

1. An installation for machining elongate workpieces such as crankshafts, camshafts or the like, comprising a plurality of workpiece holders each loaded with a workpiece and having means for holding said workpiece fixed against rotation, guiding means for guiding said loaded workpiece holders along a straight path with their elongate workpieces in co-axial relationship to each other and to said path, a plurality of tool units distributed along said path in spaced relationship, each of said units comprising a bed, a tool holder movably mounted thereon for motion transverse to said path, a rotor journaled in said tool holder for rotation about a first axis extending parallel to said straight path, an annular rotary tool mounted on said rotor for relative rotation thereon about its axis offset from said first axis, said annular tool having internal cutting edges and an internal clearance space larger than the cross-section of said loaded workpiece holders so as to afford passage of said loaded workpiece holders through said clearance space, said tool holder and said rotor being movable into a position in which said internal clearance space is in registry with said path, and conveyor means for intermittently transporting said workpiece holders on said guiding means along said path consecutively through the clearance spaces of all of said tool units and for temporarily stopping each workpiece holder in a position in which its workpiece is surrounded by said annular rotary tool and in position to be machined by said cutting edges thereof.

2. The combination claimed in claim 1 in which said conveyor means comprises drag members distributed along said path for engaging said workpiece holders and means for reciprocating said drag members in synchronism.

3. The combination claimed in claim 2 in which waiting stations are provided along said path between said tool units and in which the distance of said tool units is substantially a multiple of the length of reciprocation of said drag members.

4. The combination claimed in claim 1 in which said guiding means is formed by a track having gaps in which said annular tool holders are accommodated, the length of said gaps being less than that of said workpiece holders.

5. The combination claimed in claim 1 in which said bed is formed with a guideway extending transversely to said path, said tool holder being slidably mounted on said guideway.

* * * * *